United States Patent [19]
Tackett

[11] Patent Number: 5,529,466
[45] Date of Patent: Jun. 25, 1996

[54] RECIPROCATING VALVED PISTON HYDRAULIC PUMP ASSEMBLY FOR ANTI-LOCK BRAKING SYSTEM

[75] Inventor: Wendell D. Tackett, Ann Arbor, Mich.

[73] Assignee: Kelsey-Hayes Company, Romulus, Mich.

[21] Appl. No.: 312,818

[22] Filed: Sep. 27, 1994

[51] Int. Cl.⁶ .......................... F04B 23/04; F04B 53/12; F04B 53/14

[52] U.S. Cl. ...................... 417/529; 417/554; 417/569; 92/147; 303/116.4

[58] Field of Search .................... 417/273, 415, 417/523, 529, 540, 552, 554, 569; 92/147; 303/116.4

[56] References Cited

U.S. PATENT DOCUMENTS

| | | | |
|---|---|---|---|
| 1,478,469 | 12/1923 | Carver | 92/147 |
| 3,340,818 | 9/1967 | Schanzlin | 417/540 |
| 3,407,746 | 10/1968 | Johnson | 417/523 |
| 3,912,045 | 10/1975 | Morris | 417/554 |
| 4,715,666 | 12/1987 | Farr . | |
| 5,199,860 | 4/1993 | Stegmaier | 417/569 |

FOREIGN PATENT DOCUMENTS

| | | | |
|---|---|---|---|
| 1284307 | 11/1968 | Germany | 417/554 |
| 85269 | 5/1985 | Japan | 417/552 |
| 85591 | 5/1986 | Japan | 417/415 |
| 85590 | 5/1986 | Japan | 417/415 |
| 85592 | 5/1986 | Japan | 417/415 |

*Primary Examiner*—Charles Freay
*Assistant Examiner*—Roland G. McAndrews, Jr.
*Attorney, Agent, or Firm*—Brooks & Kushman

[57] ABSTRACT

A pumping device is provided for pumping fluid from an inlet to an outlet. The pump comprises a piston reciprocable between an inlet chamber and an outlet chamber, a first valve between the inlet and the inlet chamber and responsive to reciprocation of the piston in a first direction to communicate the inlet to the inlet chamber, and a second valve between the inlet chamber and the outlet chamber responsive to reciprocation of the piston in a second direction to communicate the inlet chamber to the outlet chamber, whereby fluid is received in the inlet chamber when the piston reciprocates in the first direction and pumped from the outlet chamber when the piston reciprocates in either direction. Also provided is a pump assembly for pumping fluid for an anti-lock braking system. The pump assembly is a dual action pump including two pistons which are stroked 90° out of phase with respect to each other by a common drive member.

5 Claims, 4 Drawing Sheets

5,529,466

RECIPROCATING VALVED PISTON HYDRAULIC PUMP ASSEMBLY FOR ANTI-LOCK BRAKING SYSTEM

TECHNICAL FIELD

This invention relates to hydraulic pumps, and more particularly to hydraulic pumps used in generating pressurized fluid within anti-lock braking systems.

BACKGROUND ART

In a typical anti-lock braking system pump assembly, the pistons are diametrically opposed to one another and reciprocate along a single axis as driven by the pump drive motor. In this configuration, the pump generally produces a pressurized fluid only during one direction of the piston stroke. A relatively rotatable sealing contact type bearing is pressed onto the eccentric diameter of the drive motor shaft such that the operation of the drive motor causes the bearing to move in a circular path about the axis of the drive motor shaft. Since the pump pistons as driven by the motor through the bearing can move only along one axis, they will sense only the component of the bearing movement along that axis. For a constant angular speed of the motor shaft, the pistons will be displaced with a sinusoidal motion. The path which the two pumps follow can be graphed as shown in FIG. 1.

Since the pumps of the prior art only provide high pressure fluid as they are being stroked in one direction (away from the center of the motor shaft), the torque on the motor shaft can be depicted as shown in FIG. 2.

This can be better visualized by picturing the mechanical linkage of a piston and crank assembly, as shown in FIG. 3.

At the 0° and 180° positions (using the standard Cartesian coordinate system shown in FIG. 3, centered at the axis of the motor shaft), there is no torque transmission to the motor shaft in the diametrically opposed piston type pump of the prior art. The torque transmission will be a maximum at the angles of 90° and 270°.

There are two primary reasons why an improvement over this design is sought. The first reason is that a cyclic torque distribution such as that shown in FIG. 2 increases the possibility of generating unwanted noise and vibration. The second reason relates to work output. The work done is proportional to the area under the curve shown in the torque graph. If a different drive mechanism were devised which flattened this curve, a constant torque level equal to one half the peak torque of the prior art curve would yield the same work done on a pump. The input energy required to drive the electric motor, however, will not be the same between the two cases. For a sinusoidal torque forcing function, as in the prior art, the average energy required to operate the motor is proportional to the rms (root means square) current draw on the motor, rather than the arithmetic average. The rms average for a pure sinusoidal curve is approximately 1.4 times the arithmetic average. Due to the inertial effects of the motor, however, a pure sinusoidal torque transmission will not be required by the motor. The actual power multiplication required to operate a motor driving the prior art design will be dependent upon the angular momentum of the motor's rotor.

A pump assembly utilizing four pumps is shown in FIG. 1.

Following the same logic as in the construction of the curves in the example shown in FIG. 2, the torque curve for the configuration of FIG. 4 would appear as shown in FIG. 5.

Due to the overlapping of these curves, the actual torque transmitted to the motor shaft will be a constant value: equal to the peak value shown in the graph (which is one half the peak value of the torque graph of the prior art design). This, therefore, optimizes the mechanical loading of the motor shaft and ensures that additional power losses will not be encountered in the electric motor. However, this design is impractical for two reasons. First, a much higher frictional load at the contact areas of the bearing race and the pistons is encountered in this design, compared to the design of the prior art, due to the fact that the bearing must now slide across the face of certain pistons while they are being loaded. Second, it is impractical for the size and cost of the unit to use a four-pump design.

It would be desirable to develop a drive mechanism using two pumps which attains the ideal loading condition (four power strokes per revolution occurring at 90° intervals) with no penalties in cost, size or performance.

It would also be desirable to develop such a drive mechanism in which there is an improvement in cost, size and performance of the pump assembly.

It is also desirable to develop a dual-action hydraulic pump which produces pressurized fluid as the piston is stroked in either direction.

A development of a dual-action hydraulic pump would provide several advantages over the prior art. A dual-action hydraulic pump would provide smoother flow and pressure output, it would reverse the positions of the inlet and outlet ports in order to allow an integrated low pressure accumulator, and it would eliminate the piston return spring. Along with these improvements would come an improvement in pump efficiency which reduces power requirements and electronic component sizing.

Accordingly, an object of the present invention is to provide a pumping device for pumping fluid from an inlet to an outlet in which the piston pumps fluid from the pump as the piston moves in either direction.

A further object of the present invention is to provide a pump assembly with improved cost, size and performance characteristics.

Yet another object of the present invention is to provide a pump assembly for pumping fluid in an antilock braking system from a motor-driven orbitally rotating cam, wherein two pumps may be arranged in a side-by-side relationship, and the pistons of the two pumps may be translated by the single cam.

Other objects, uses and advantages of this invention are apparent from a reading of this description which proceeds with reference to the accompanying drawings.

DISCLOSURE OF THE INVENTION

One embodiment of the present invention provides a pumping device for pumping fluid from an inlet to an outlet, comprising: a piston reciprocable between an inlet chamber in communication with the inlet and an outlet chamber in communication with the outlet, the piston configured with a first portion in the inlet chamber and a second portion smaller than the first portion in the outlet chamber; a first valve being between the inlet and the inlet chamber and responsive to reciprocation of the piston in a first direction to communicate the inlet to the inlet chamber for drawing fluid into the inlet chamber; and a second valve between the inlet chamber and the outlet chamber responsive to reciprocation of the piston in a second direction to communicate the inlet chamber to the outlet chamber for moving fluid received from the inlet chamber to the outlet chamber; whereby fluid is received in the inlet chamber when the piston reciprocates in the first direction and pumped from the outlet chamber when the piston reciprocates in either direction.

Another embodiment of the present invention provides a pump assembly for pumping fluid for an antilock braking system from a motor driven orbitally rotating cam, comprising: a base; a first pump and a second pump disposed respectively along first and second parallel axes and mounted to the base, the first and second pumps including first and second pistons, respectively; a drive member having first and second arms, the first and second arms being pivotally connected to the first and second pistons, respectively to stroke the pistons; the drive member being slidably and pivotally connected with respect to the base, and orbitally connected with respect to the cam such that drive member moves in accordance with the orbital rotation of the cam, as restricted by the slidable and pivotal connection; and the orbital rotation of the cam translating the drive-member such that the first and second pistons are stroked 90° out of phase with respect to each other.

BEST MODES FOR CARRYING OUT THE INVENTION

Figure 1:
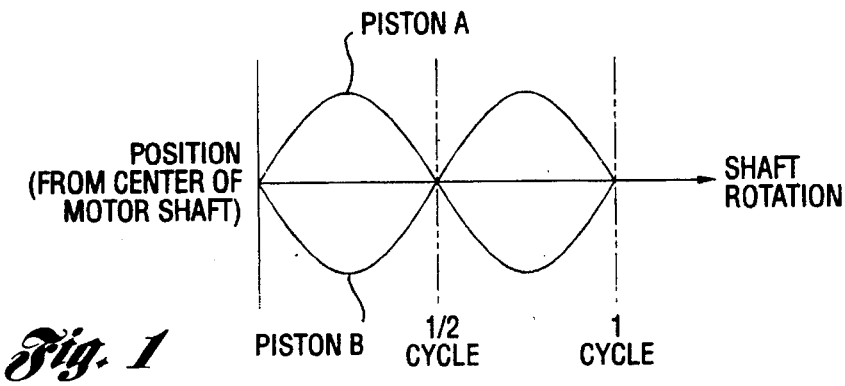
FIG. 1 shows a graphical representation of the paths two pumps would follow in accordance with the prior art pump assembly.
Figure 2:
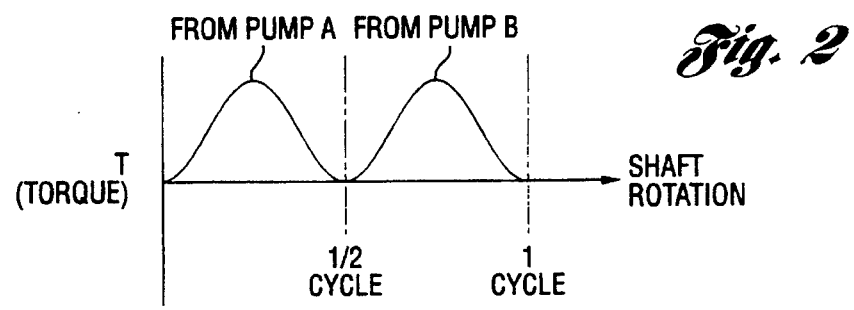
FIG. 2 shows a graphical representation of the torque on the motor shaft in accordance with the prior art pump assembly.
Figure 3:
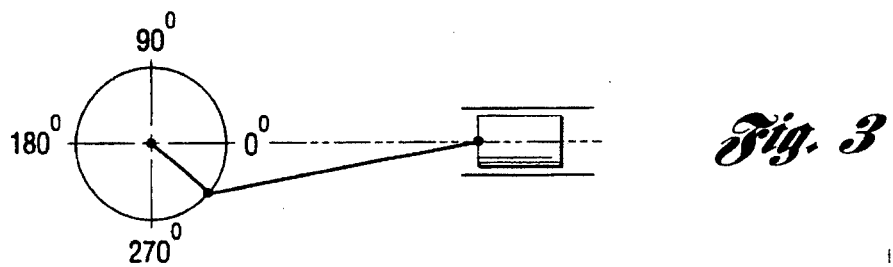
FIG. 3 shows a schematic drawing of the mechanical linkage of a piston and crank assembly.
Figure 4:
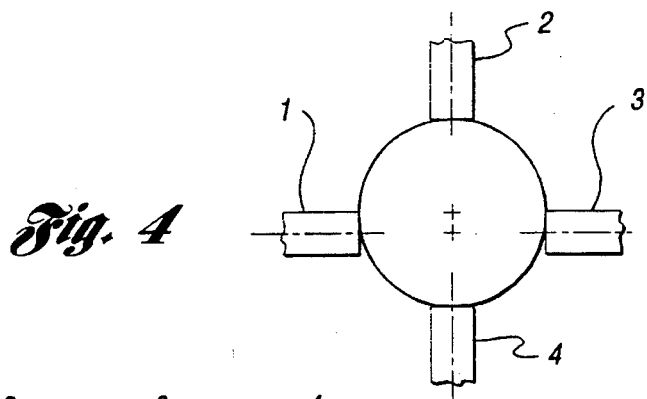
FIG. 4 shows a schematic diagram of a hypothetical pump assembly using four pumps.
Figure 5:
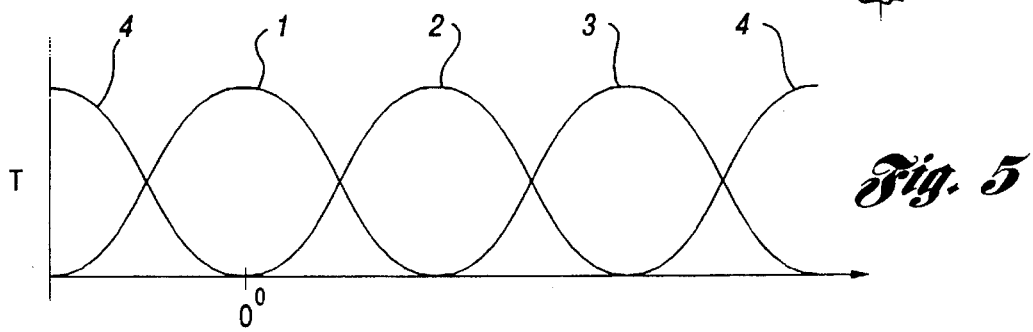
FIG. 5 shows a graphical illustration of the torque on a motor shaft in accordance with the assembly of FIG. 4.
Figure 6:
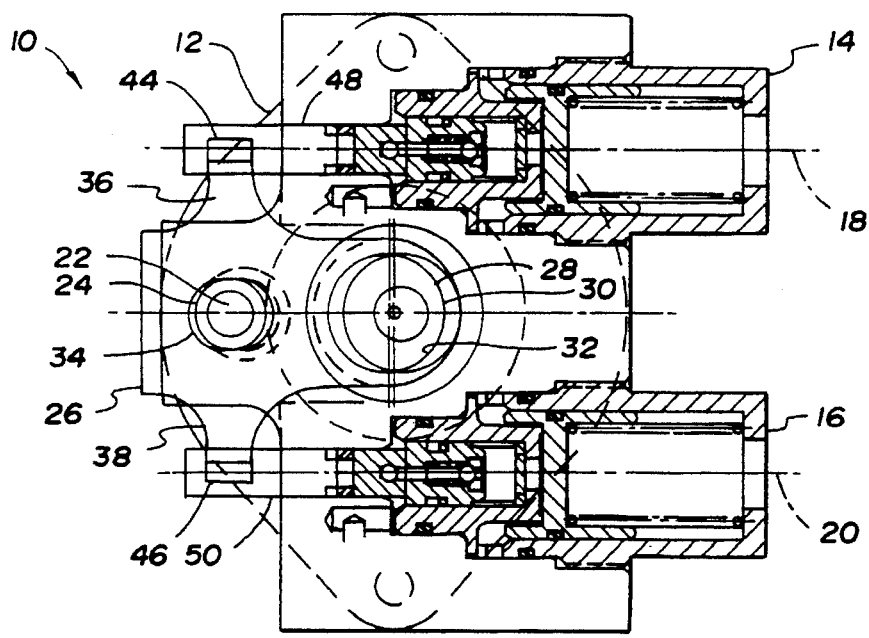
FIG. 6 shows a cross-sectional plan view of a pump assembly for an anti-lock braking system according to the present invention.
Figure 7:
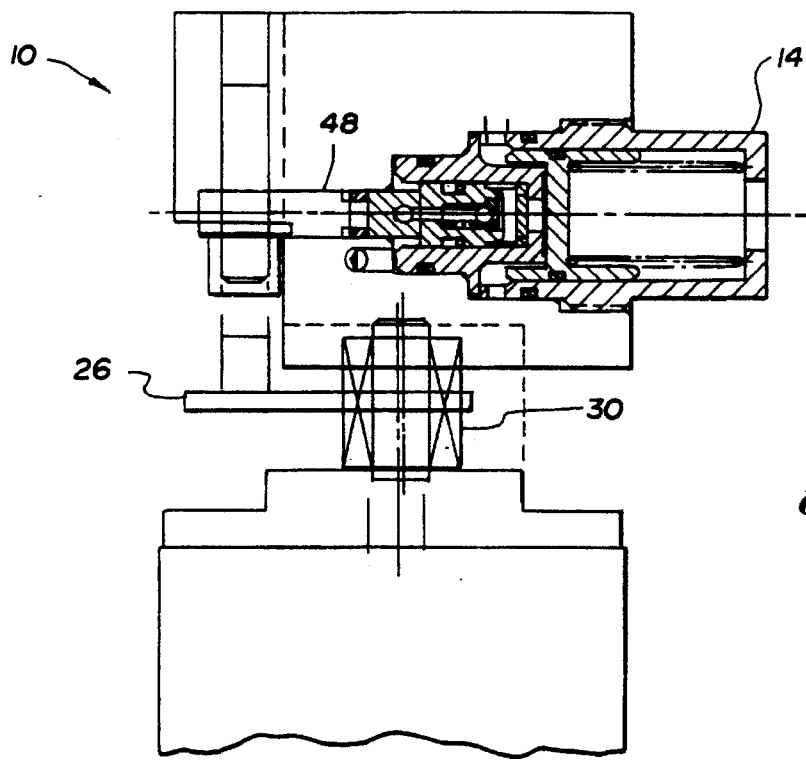
FIG. 7 shows a cross-sectional elevation view of a pump assembly for an anti-lock braking system according to the present invention.

A pump assembly 10 is provided as shown in FIG. 6. The assembly is supported upon a base 12, which is mounted to a vehicle. First and second pumps 14,16 are mounted to the base and disposed respectively along first and second parallel axes 18,20. A pin 22 having a bushing 24 thereon extends from the base 12. The first and second axes 18,20 straddle the pin 22.

A drive member 26 translates motion of a motor driven cam 28 to drive the pumps. The cam 28 has a bearing 30 thereon which is operatively received within an aperture 32 formed in the drive member 26. The pin 22 and bushing 24 guide the drive member 26 by means of an oval slot 34 which slidably and pivotally engages with the pin. Hence, the drive member 26 follows the orbital movement of the cam 28, as restricted by the pin 22 and the oval slot 34. Of course, the slot and pin could be located on the base and drive member respectively.

Figure 9:
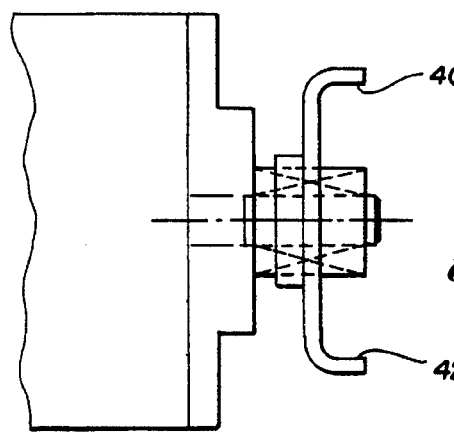
FIG. 9 shows an end view of the motor and drive linkage for the anti-lock braking system in accordance with the present invention.

In this manner, the drive member 26 is rocked and translated back and forth along the parallel axes 18, 20. The drive member 26 includes first and second arms 36,38. Each arm includes an extension tab 40,42 as shown in FIG. 9. The tabs 40,42 are sized to fit loosely within the slots 44,46 which are formed in the pistons 48,50. The translation and rocking motion of the drive member 26 which is caused by rotation of the cam 28 along with the restriction of the pin 22 upon movement of the drive member, causes the arms 36,38 to rock and translate along the axes 18,20. The tabs 40,42, which loosely fit within the slots 44,46, cause the pistons 48,50 to translate along the axes 18,20. The loose fit between the tabs 40,42 and the slots 44,46 provides room for any transverse movement of the tabs 40,42 with respect to the axes 18,20. This transverse movement of the tabs 40,42 results from the rocking motion of the drive member 26. The tabs 40,42 are allowed to rock back and forth within the slots 44,46 without disturbing the reciprocating motion of the piston along the first axis 18.

Figure 10:
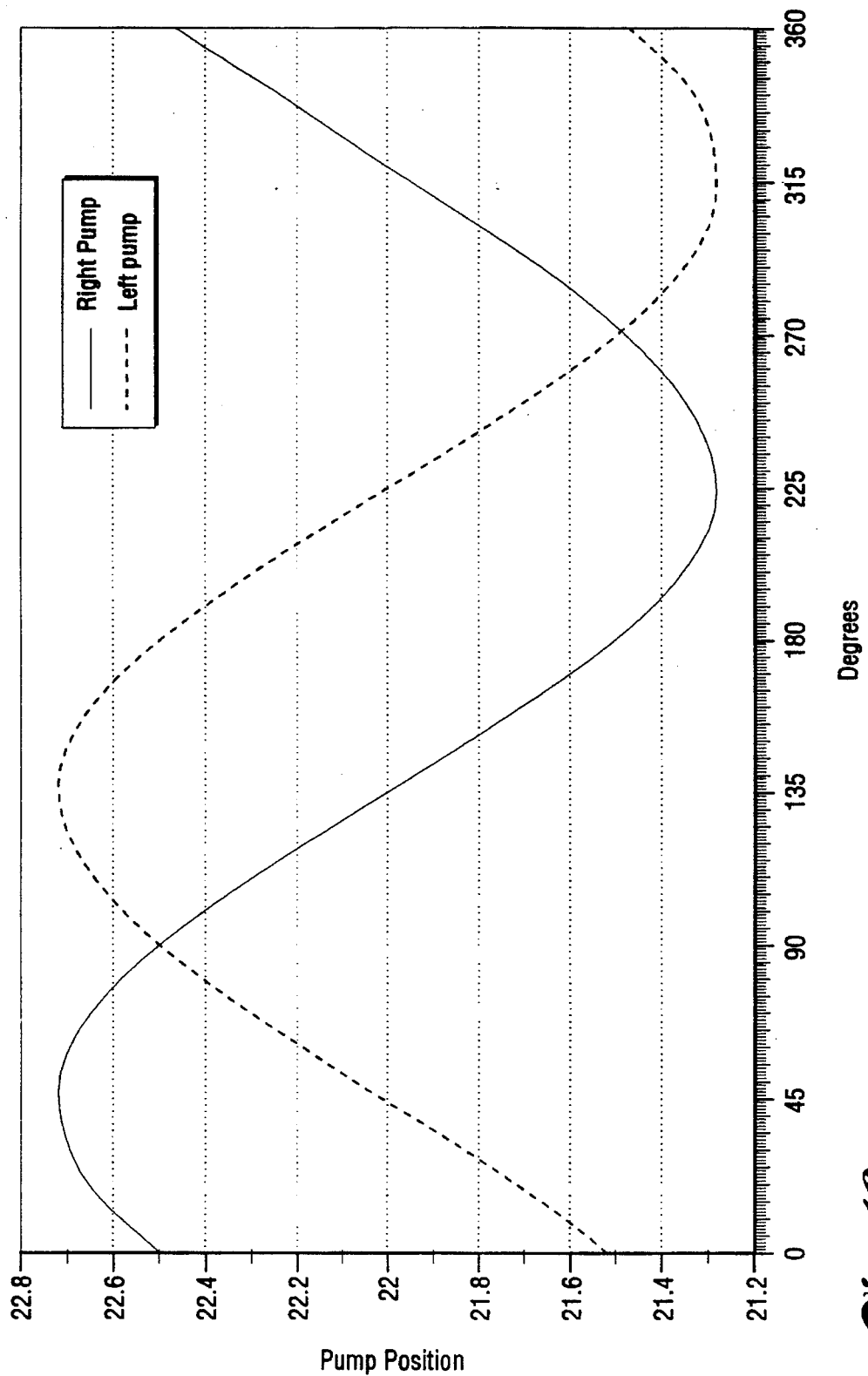
FIG. 10 shows a graphical illustration of pump position versus degrees of movement of the right and left pumps in accordance with the present invention.

As a result of the rocking motion of the drive member 26 which is caused by oscillation of the cam 28, the pistons 48,50 are stroked with a 90° phase difference with respect to each other. This 90° phase lag is illustrated in FIG. 10. One can see from FIG. 10 that the left pump, as illustrated by the dashed line, is operating with a 90° phase difference with respect to the right pump, which is illustrated by a solid line. Accordingly, due to the 90° phase lag and the dual pumping action of the two pumps, a more continuous pumping profile is established.

Figure 8:
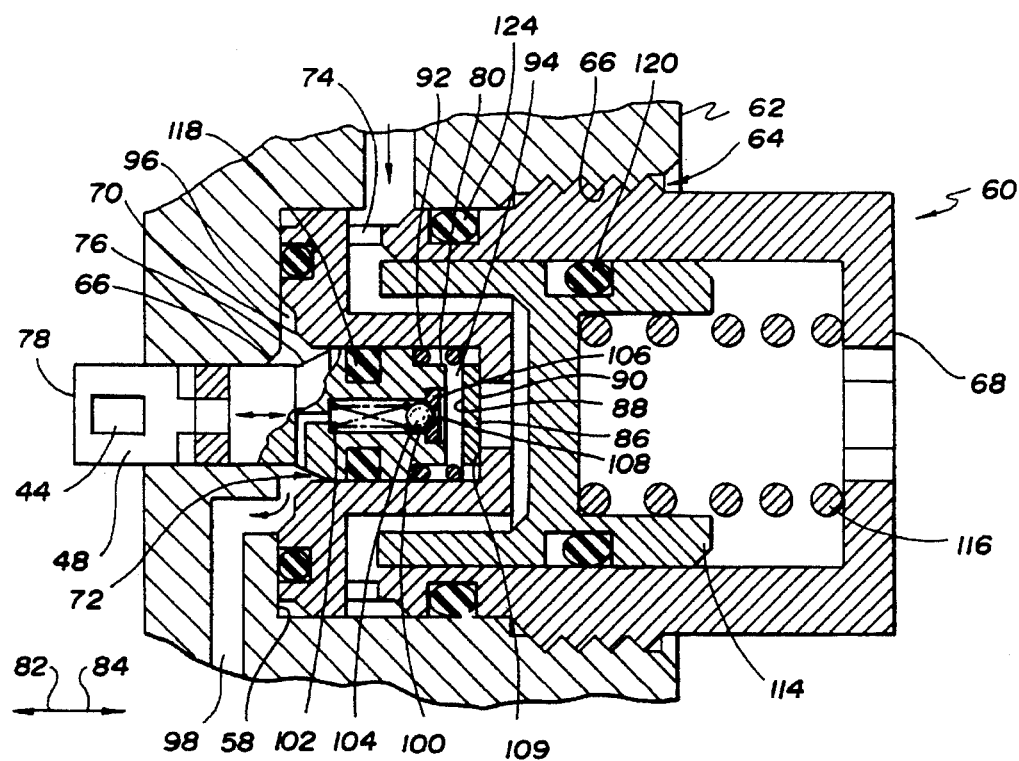
FIG. 8 shows a cross-sectional elevation view of an alternative dual-action hydraulic pump according to the present invention.

As shown in FIG. 8, each pump is a dual-action hydraulic pump. In other words, each pump pumps pressurized fluid as its respective piston travels in each direction. FIG. 8 shows an alternative dual-action hydraulic pump 60 supported by a valve body 62. The valve body 62 has a pump chamber 64 therein defined by an inner wall 66 thereof. A pump body 68 is supported within the pump chamber 64. The pump body includes an inner surface 70 which forms a cylindrical chamber 72 within the pump body. The pump body has an inlet port 74 formed therein in fluid communication with the cylindrical chamber 72.

The piston 48 has an outer surface 76. The piston is slidably received within the cylindrical chamber 72 of the pump body, and has first and second ends 78,80 thereof. The piston 48 is reciprocally slidable in first and second directions 82,84 within the cylindrical chamber 72.

An inlet check valve 86 is operatively positioned within the cylindrical chamber 72 adjacent the second end 80 of the piston. The inlet check valve 86 has first and second surfaces 88,90 thereof. The spring 92 biases the inlet check valve 86 to a closed position against the inner surface 70 of the pump body 68. Valve 86 is a disc having a diameter substantially equal to that of the chamber 72. The inlet port 74 is thereby placed in selective fluid flow communication with the cylindrical chamber 72.

A pump inlet chamber 94 is formed within the cylindrical chamber 72 for receiving fluid from the inlet port 74. The pump inlet chamber is formed by at least a portion of the outer surface 76 of the piston at the second end 80, the first surface 88 of the inlet check valve 86, and at least a portion of the inner surface 70 of the cylindrical chamber 72.

A pump outlet chamber 96 is formed adjacent the first end 78 of the piston and is in fluid flow communication with the outlet port 98. The pump outlet chamber 96 is formed by at least a portion of the outer surface 76 of the piston, the inner surface 70 of the pump body, and the inner wall 66 of the valve body 62. The pump outlet chamber 96 receives fluid from the pump inlet chamber 94 through the outlet check valve 100. As shown in FIG. 8, the outlet check valve 100 comprises a spring 102, a ball 104, and a seat 106. The spring 102 forces the ball 104 against the seat 106, which closes the channel 108 and discommunicates the pump inlet chamber 94 from the pump outlet chamber 96. The boundary of the pump outlet chamber 96 is defined at the outlet port 98 by a plane passing through the bottom wall 58 of the pump chamber 64.

The inlet check valve 86 is responsive to movement of the piston 48 in the first direction 82 to communicate the inlet port 74 with the pump inlet chamber 94 to allow fluid to fill the pump inlet chamber. As the piston moves in the first direction 82, a pressure drop is created within chamber 72 and the inlet check valve 86 is drawn in the first direction against the force of the spring 92, compressing it in order to communicate the inlet port with the pump inlet chamber. A gap is thereby created between the periphery of the inlet check valve 86 and the seat 109, thus allowing fluid to pass therethrough into the pump inlet chamber.

As the piston moves in the second direction 84, the inlet check valve 86 is forced in the second direction by the pressure of fluid in the pump inlet chamber 94, thus closing the inlet check valve 86 and discommunicating the pump inlet chamber from the inlet port. This closure of the inlet check valve creates the need for pressurized fluid to seek an alternative exit from the pump inlet chamber 94 as the piston moves in the second direction 84. This alternative exit is provided by the outlet check valve 100.

The outlet check valve 100 is responsive to movement of the piston 48 in both the first and second directions 82,84. As the piston moves in the first direction, the outlet check valve discommunicates the pump outlet chamber 96 from the pump inlet chamber 94 in order to facilitate pumping of fluid from the pump outlet chamber. As the piston 48 moves in the first direction, the ball 104 is held against the seat 106 by the spring 102 and the force of pressurized fluid in the pump outlet chamber. Accordingly, as the piston moves in the first direction, fluid in the pump outlet chamber 96 is forced out of the pump through the outlet port 98. The outlet check valve 100 is further responsive to movement of the piston 48 in the second direction 84 to communicate the pump inlet chamber 94 with the pump outlet chamber 96 to allow movement of fluid from the pump inlet chamber to the pump outlet chamber to facilitate pumping of fluid from the pump outlet chamber. As the piston moves in the second direction, the pressure of fluid in the pump inlet chamber 94 causes the ball 104 to move against the force of the spring 102 in the first direction 82 with respect to the piston. As the ball moves in the first direction, the channel 108 is opened to allow fluid to pass from the pump inlet chamber 94 through the outlet check valve 100 to the pump outlet chamber 96.

The piston 48 has a first cross-sectional area adjacent the pump inlet chamber 94 and a second cross-sectional area adjacent the pump outlet chamber 96. The first cross-sectional area is approximately twice as large as the second cross-sectional area. Accordingly, as the piston 48 moves in the second direction 84, the volume of the pump inlet chamber 94 decreases at a rate which is approximately twice the rate which the volume of the pump outlet chamber 96 increases in order to facilitate pumping of fluid from the pump outlet chamber. As the piston moves in the second direction, the outlet check valve opens and allows fluid to travel from the pump inlet chamber 94 to the pump outlet chamber 96. Since the volume of pump inlet chamber is decreasing at twice the rate at which the volume of the pump outlet chamber is increasing, excess fluid is being pumped into the pump outlet chamber. This excess fluid is forced to seek an exit from the pump outlet chamber which is already full of fluid. This exit is provided by the outlet portion 98. Accordingly, one half of the volume of fluid entering the pump outlet chamber from the pump inlet chamber exits the pump outlet chamber during that particular stroke of the piston in the second direction. Using this configuration, the same volume of fluid is pumped through the outlet port 98 as the piston is moving in either the first direction or the second direction.

Of course, the first cross-sectional area need not be twice the size of the second cross-sectional area. The range of operative sizes is large.

Referring to FIG. 8, the low pressure accumulator piston 114 and LPA spring 116 assure that sufficient fluid pressure is maintained between the inlet port 74 and the pump inlet chamber 94. The LPA spring 116 forces the low pressure accumulator piston 114 in the first direction against pressure of incoming fluid through the inlet port 74. In this manner, a minimum fluid pressure is maintained to assist in moving fluid past the inlet check valve 86 and into the pump inlet chamber 94.

A rubber piston seal 118 is provided circumscribing the piston adjacent the second end 80 of the piston. The piston seal 118 prevents leakage of fluid from the pump inlet chamber 94 to the pump outlet chamber 96 along the outer surface 76 of the piston. The piston seal 118 maintains a tight relationship with the inner surface 70 of the cylindrical chamber 72.

Seal 120 is provided between the low pressure accumulator piston and the pump body. In addition, seal 124 is positioned between the valve body 62 and the pump body 68.

While the best mode for carrying out the invention has been described in detail, those familiar with the art to which this invention relates will recognize various alternative designs and embodiments for practicing the invention as defined by the following claims.

What is claimed is:

1. A hydraulic pump adapted to be received in a valve body for an anti-lock braking system, the valve body having a pump chamber therein defined by an inner wall thereof, comprising:

a pump body located within the pump chamber, said pump body having an inner surface forming a cylindrical chamber therein and further having an inlet port formed therein in fluid communication with said cylindrical chamber;

a piston having an outer surface, said piston being slidably received within said cylindrical chamber of said pump body, said piston having first and second ends thereof, said piston being reciprocally slidable in first and second directions;

an inlet check valve operatively positioned within said cylindrical chamber adjacent said second end of said piston, said inlet check valve having first and second surfaces thereof;

at least a portion of said outer surface of said piston, said inner surface of said pump body, and said inner wall of said valve body forming a pump outlet chamber;

said outer surface of said piston at said second end, said first surface of said inlet check valve, and at least a portion of said inner surface of said cylindrical chamber forming a pump inlet chamber for receiving fluid from said inlet port;

an outlet check valve operatively positioned within said piston to selectively communicate and discommunicate said pump inlet chamber with said pump outlet chamber;

said inlet check valve being responsive to movement of said piston in said first direction to communicate said inlet port with said pump inlet chamber to allow fluid to fill said pump inlet chamber, and further being responsive to movement of said piston in said second direction to discommunicate said inlet port from said pump inlet chamber;

said outlet check valve being responsive to movement of said piston in said first direction to discommunicate said pump outlet chamber from said pump inlet chamber in order to facilitate pumping of fluid from said pump outlet chamber, and being further responsive to movement of said piston in said second direction to communicate said pump inlet chamber with said pump outlet chamber to allow movement of fluid from said pump inlet chamber to said pump outlet chamber to facilitate pumping of fluid from said pump outlet chamber; and said piston having a first cross-sectional area adjacent said pump inlet chamber and a second cross-sectional area adjacent said pump outlet chamber, said first cross-sectional area being approximately twice as large as said second cross-sectional area, such that, as said piston moves in said second direction, the volume of said pump inlet chamber decreases at a rate which is approximately twice the rate at which the volume of said pump outlet chamber increases in order to facilitate pumping of fluid from said pump outlet chamber.

2. A hydraulic pump adapted to be received in a valve body for an anti-lock braking system, the valve body having a pump chamber and an outlet formed therein, comprising:

a pump body located within the pump chamber, said pump body having a cylindrical chamber and an inlet formed therein:

a piston movable within said pump body cylindrical chamber in first and second directions;

a pump inlet chamber and a pump outlet chamber formed substantially within said pump body adjacent opposing ends of said piston, said pump inlet chamber being in selective fluid flow communication with said inlet, and said pump outlet chamber being in fluid flow communication with said outlet;

an inlet check valve responsive to movement of said piston in said first direction to communicate said inlet port with said pump inlet chamber to allow fluid to fill said pump inlet chamber, and further being responsive to movement of said piston in said second direction to discommunicate said inlet port from said pump inlet chamber;

said pump inlet chamber decreasing in volume as said piston moves in said second direction and increasing in volume as said piston moves in said first direction, and said pump outlet chamber increasing in volume as said piston moves in said second direction and decreasing in volume as said piston moves in said first direction;

an outlet check valve responsive to movement of said piston in said first direction to discommunicate said pump outlet chamber from said pump inlet chamber in order to facilitate pumping of fluid from said pump outlet chamber as said pump outlet chamber decreases in volume, and being further responsive to movement of said piston in said second direction to communicate said pump inlet chamber with said pump outlet chamber to allow movement of fluid from said pump inlet chamber to said pump outlet chamber to facilitate pumping of fluid from said pump outlet chamber as said pump inlet chamber decreases in volume; and said piston having a first cross-sectional area adjacent said pump inlet chamber and a second cross-sectional area adjacent said pump outlet chamber, said first cross-sectional area being approximately twice as large as said second cross-sectional area, such that, as said piston moves in said second direction, the volume of said pump inlet chamber decreases at a rate which is approximately twice the rate at which the volume of said pump outlet chamber increases in order to facilitate pumping of fluid from said pump outlet chamber.

3. The hydraulic pump of claim 2, further comprising:

a rubber seal circumscribing said piston adjacent said second end of said piston.

4. A pump assembly for pumping fluid for an anti-lock braking system from a motor-driven orbitally rotating cam, comprising:

a base;

a first pump and a second pump disposed respectively along first and second parallelaxes and mounted to said base, said first and second pumps including first and second pistons, respectively;

a drive member having first and second arms, said first and second arms being pivotally connected to said first and second pistons respectively to stroke the pistons;

said drive member being slidably and pivotally connected with respect to said base, and orbitally connected with respect to said cam such that said drive member moves in accordance with the orbital rotation of said cam, as restricted by said slidable and pivotal connection;

said orbital rotation of said cam translating said drive member such that said first and second pistons are stroked 90° out of phase with respect to each other;

a pan extending from said base;

a bearing circumscribing said cam;

said drive member including first and second apertures formed therein, said first aperture having a generally oval shape;

said pin being received within said first generally oval shaped aperture to slidably and pivotally engage said drive member with respect to said base; and said bearing being received within said second aperture to provide said orbital connection between said drive member and said cam.

5. The pump assembly of claim 4, wherein each of said first and second pumps includes a device for pumping fluid from an inlet to an outlet, comprising:

a piston reciprocable between an inlet chamber in communication with the inlet and an outlet chamber in communication with the outlet, said piston configured with a first portion in said inlet chamber and a second portion smaller than said first portion in said outlet chamber;

a first valve being between said inlet and said inlet chamber and responsive to reciprocation of said piston in a first direction to communicate the inlet to the inlet chamber for drawing fluid into said inlet chamber; and a second valve between said inlet chamber and said outlet chamber responsive to reciprocation of said piston in a second direction to communicate the inlet chamber to said outlet chamber for moving fluid received in said inlet chamber to said outlet chamber;

whereby fluid is received in said inlet chamber when said piston reciprocates in said first direction and pumped from said outlet chamber when said piston reciprocates in either direction.

* * * * *